Aug. 15, 1950     M. J. FRENCHIK     2,518,537
TRICYCLE
Filed June 10, 1948     2 Sheets-Sheet 1
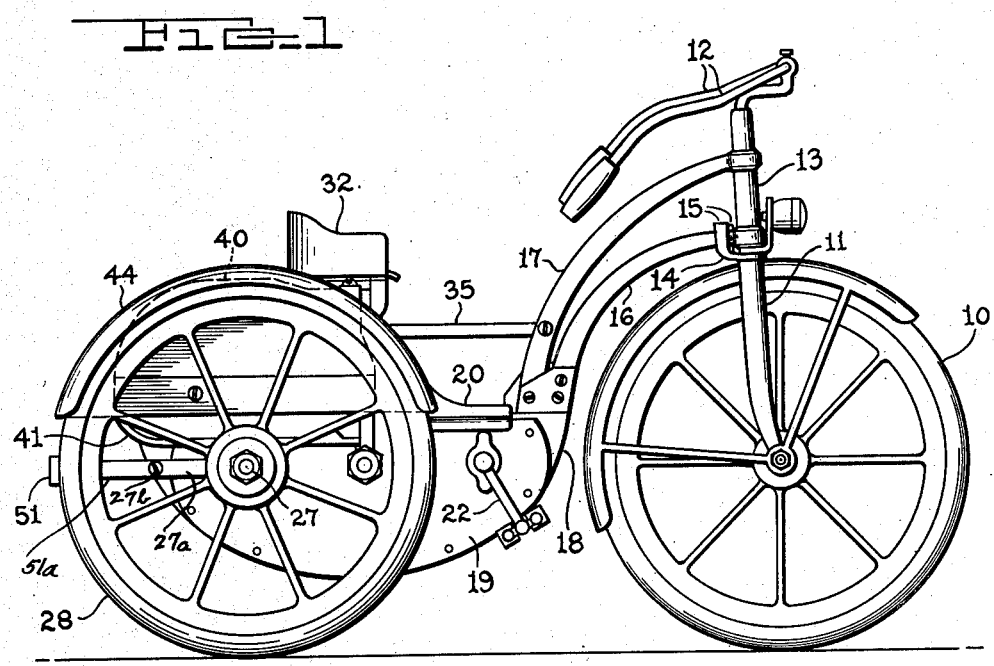
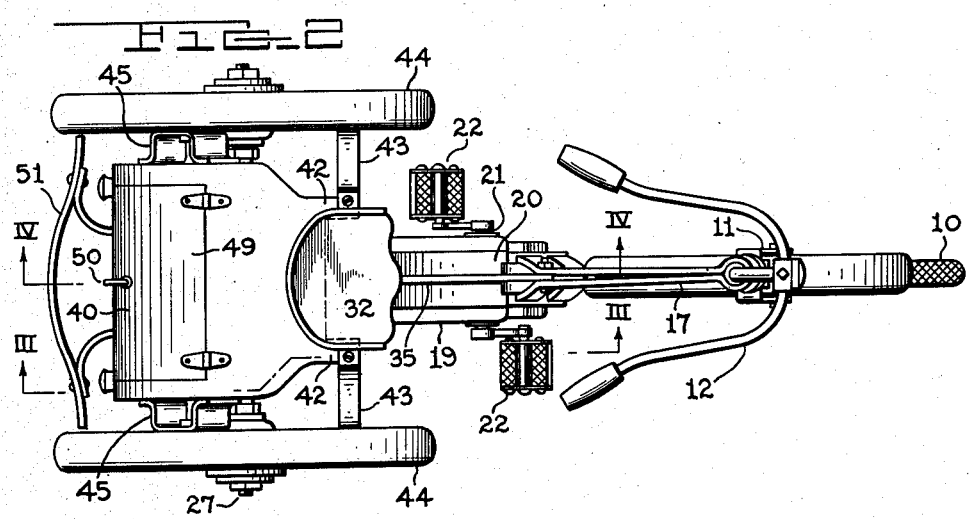
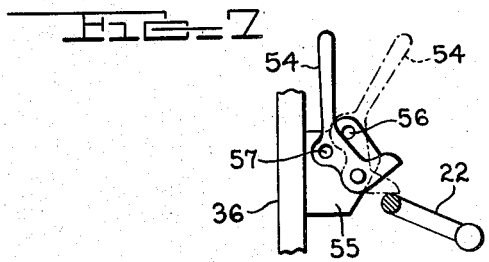
INVENTOR.
MICHAEL J. FRENCHIK
BY Archworth Martin
ATTORNEY Aug. 15, 1950 — M. J. FRENCHIK — 2,518,537
TRICYCLE
Filed June 10, 1948 — 2 Sheets-Sheet 2
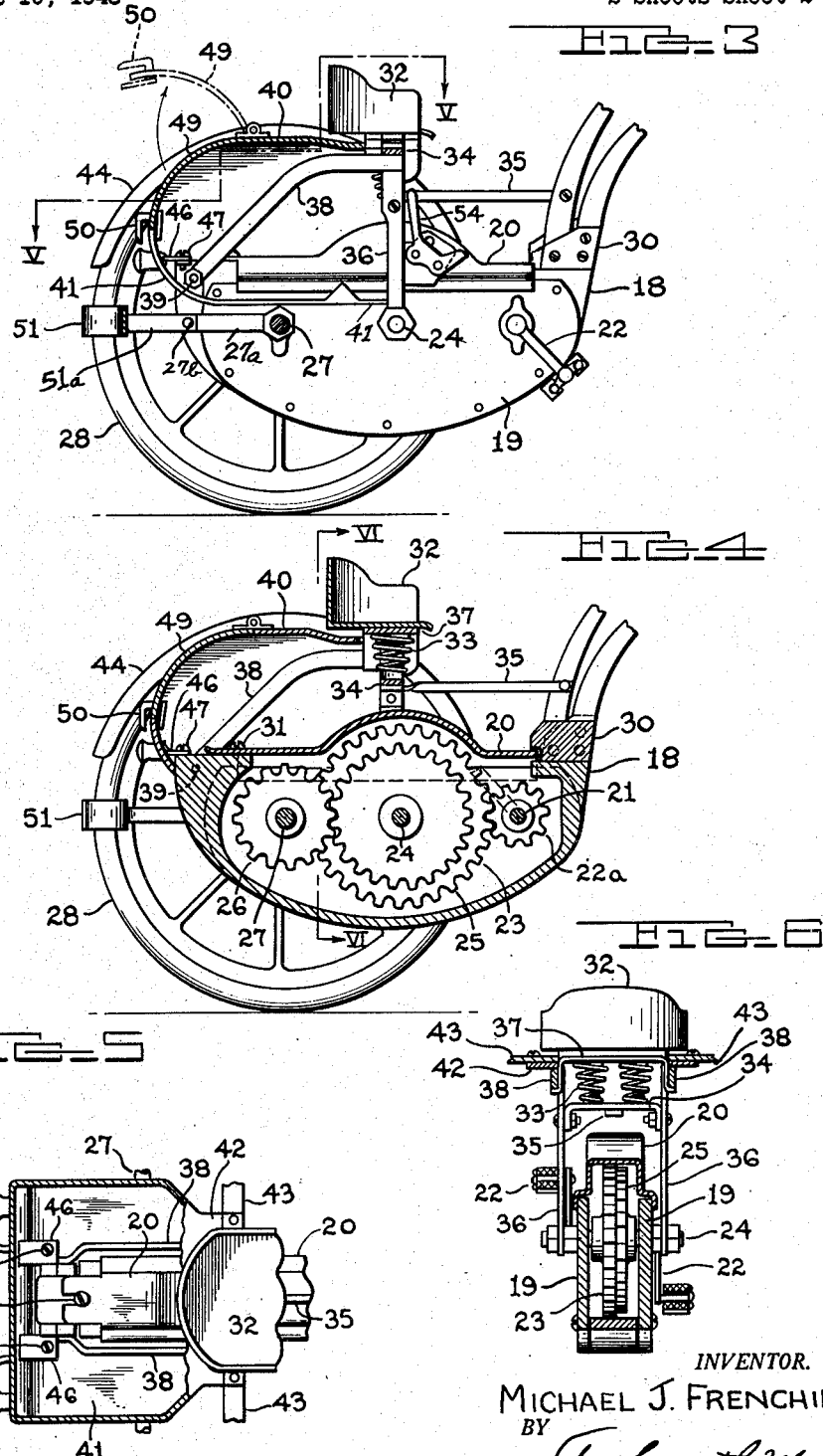
INVENTOR.
MICHAEL J. FRENCHIK
BY Archworth Martin
ATTORNEY Patented Aug. 15, 1950

2,518,537

UNITED STATES PATENT OFFICE 2,518,537

TRICYCLE

Michael J. Frenchik, Pittsburgh, Pa.

Application June 10, 1948, Serial No. 32,186

4 Claims. (Cl. 280—202)

My invention relates to tricycles, and has for one of its objects the provision of an improved arrangement of transmission gearing and a gear case therefor, the case having a cover plate that can conveniently be removed for inspection and greasing or lubrication of the transmission gears, the said cover serving also as part of the bottom wall of a luggage compartment, and the gear case constituting a part of the framework and body of the vehicle.

Another object of my invention is to provide an improved form of seat mounting for the vehicle.

Still another object of my invention is to provide a luggage carrier or compartment of improved form and which is connected to the vehicle frame in a simplified and improved manner as compared to luggage compartments heretofore used on vehicles.

In the accompanying drawings, Figure 1 is a side view of the vehicle; Fig. 2 is a plan view thereof; Fig. 3 is a view taken on the line III—III of Fig. 2; Fig. 4 is a view taken on the line IV—IV of Fig. 2; Fig. 5 is a view taken on the line V—V of Fig. 3; Fig. 6 is a view taken on the line VI—VI of Fig. 4, and Fig. 7 is a fragmentary view showing means for locking the vehicle against unauthorized use.

The front wheel 10 of the vehicle, its fork 11, handle bars 12 and steering column 13 may be of standard construction such as commonly found in bicycles. The fork 11 has rigidly secured thereto a clip 14 that is provided with yieldable fingers 15 extending upwardly therefrom in relatively-forked relation, along the sides of a frame bar 16 so that the fingers will yield to permit steering and will serve to thereafter automatically return the steering wheel 10 to approximately a straight-ahead position.

A second frame bar 17 is secured to the steering column 13 through which the steering shaft for the wheel 10 extends, and these bars 16—17 are connected to an upwardly-extending portion of a gear case 18. The gear case has side plates 19 that usually will remain permanently in place, and a cover plate 20.

A shaft 21 extending through the gear case carries pedals 22 at its ends. Also a driving pinion 22a is secured to the shaft 21 within the gear case and meshes with a gear wheel 23 that is rotatably mounted upon a shaft 24 that extends entirely through the gear case. A second gear wheel 25 is rigidly connected with the gear wheel 23 so as to turn therewith. This gear wheel 25 serves to drive a gear wheel 26 that is secured to an axle 27 carried by the rear wheels 28. It will be understood that the various gear wheels or their shafts will usually be provided with conventional ball bearings.

The cover 20 for the gear case has flanges partly overlapping the faces of the side plates 19 as shown more clearly in Fig. 6, and its forward edge extends into a slot in a block 30 that serves as an extension for the gear case and to which the frame bars 16—17 are directly connected. At its rear end, the cover plate is held in place by a screw 31, that is accessible upon raising the trunk lid 49. When this screw is removed, the cover plate can simply be withdrawn for inspection and lubrication of the gears.

A seat 32 is supported by springs 33 that rest upon a cross bar 34. This cross bar is connected to the frame member 17 by a strut 35, and the bar 34 is vertically-supported by legs 36 through whose lower end the rod or shaft 24 extends. The seat has a cross-strip 37 secured to its lower side and serving as a seat for the upper ends of the spring 33. The ends of this strip 37 are downwardly and laterally bent as shown more clearly in Fig. 6, to extend beneath frame bars 38 whose forward ends are welded or otherwise connected to the legs 36 and whose rear ends are secured at 39 to the rear end of the gear case.

The down-turned ends of the seat bar 37 are slidable along the vertical edges of the legs 36 during compression and expansion of the spring 33, upward movements of the seat being limited by the laterally-turned lower ends of this seat bar engaging beneath the lower edges of the frame members 38.

A luggage compartment 40 has bottom wall portions 41 that extend alongside the gear case, the gear case cover 20 constituting a portion of the bottom wall for the compartment. The upper forward portion of the compartment has extensions 42 that rest upon the bars 38 and have strips 43 connected thereto by screws, the strips extending laterally to support the mud guards 44 near their forward ends. Further rearwardly, the mud guards are connected to the sides of the compartment 40 by straps 45 that may be welded or secured by screws to the compartment.

The lower body portion of the compartment 40 has clips or short straps 46 welded thereto, and these clips are secured to the gear case by screws 47. Upon removal of the screws 47, the compartment can simply be lifted out of the frame.

The compartment 40 has a lid 49 hinged thereto and is held in place by a conventional rotatable latch 50. For inspection or lubrication of the gears, the lid 49 can simply be lifted and the screw 31 removed to prevent withdrawal of the gear case cover 20.

A rear bumper 51 is provided for the protection of the luggage compartment against collision damage. The arms 51a of this bumper are connected to the gear case 19 by screws or bolts 27b that also support brace bars 27a for the axle 27, at each side of the gear case.

In order to prevent theft or unauthorized use of the vehicle, I provide (Fig. 7) a locking lever 54 that is pivotally mounted upon a plate 55 carried by one of the legs or uprights 36. There is a hole 56 in the bracket plate 55 and a hole 57 in the lever for receiving a padlock. When the lever 54 is swung to its dotted line position in Fig. 7 and locked there, the lower leg thereof will be in the path of the pedal or crank 22 to thereby hold the tricycle against being driven.

I claim as my invention:

1. A tricycle having a frame that unitarily connects the steering column and rear axle of the vehicle, the frame comprising a bar connected at its forward end to the steering column, a gear case connected at its forward end to the rear end of the said bar, the said axle extending through a rear portion of the gear case and having a gear wheel through which power is applied to the rear wheels, a pedal shaft extending into the forward part of the gear case, gear wheels in the case, for transmitting power from the pedal shaft to the rear axle, a shaft for one of the gear wheels, extending through the side walls of the gear case, upwardly-extending seat-supporting posts disposed at the sides of the gear case and supported by the said shaft, at their lower ends, and a strut bar extending from the seat posts to the first-named bar.

2. A tricycle having a frame that comprises a gear case which is supported near its rear end by an axle for the rear wheels of the vehicle, frame members connecting the forward end of the gear case to the steering column for the front wheel, transmission mechanism driven from a point near the forward end of the gear case, for rotating the axle and rear wheels secured thereto, seat-supporting members carried by the gear case at points adjacent to its mid portion, a cover for the gear case, extending rearwardly from between the seat-supporting members, and means adjacent to the rear end of the gear case, for detachably securing the cover thereto.

3. A tricycle having a frame that comprises a gear case which is supported near its rear end by an axle for the rear wheels of the vehicle, frame members connecting the forward end of the gear case to the steering column for the front wheel, transmission mechanism driven from a point near the forward end of the gear case, for rotating the axle and rear wheels secured thereto, uprights on the gear case, near the middle thereof, for supporting a seat, a brace bar connecting the uprights to said frame members, and brace bars connecting the uprights to the rear end of the gear case.

4. A tricycle having a frame that comprises a gear case which is supported near its rear end by an axle for the rear wheels of the vehicle, frame members connecting the forward end of the gear case to the steering column for the front wheel, transmission mechanism driven from a point near the forward end of the gear case, for rotating the axle and rear wheels secured thereto, uprights on the gear case, near the middle thereof, for supporting a seat, a cover for the gear case, extending rearwardly from the seat supporting members, means adjacent to the rear end of the gear case for detachably securing the cover thereto, a trunk compartment positioned on the gear case, with the said cover serving as a bottom wall for the compartment, and a rear door in the compartment serving for access thereto and for access to the detachable connection by which the said cover is secured to the gear case.

MICHAEL J. FRENCHIK.

REFERENCES CITED

The following references are of record in the file of this patent:

UNITED STATES PATENTS

| Number | Name | Date |
| --- | --- | --- |
| 579,753 | Henkel | Mar. 30, 1897 |
| 1,374,513 | Mosher et al. | Apr. 12, 1921 |